Aug. 26, 1952     J. L. MAHONEY ET AL     2,608,287
TRAY FOR CONVEYER OVEN
Filed Aug. 12, 1946     3 Sheets-Sheet 1
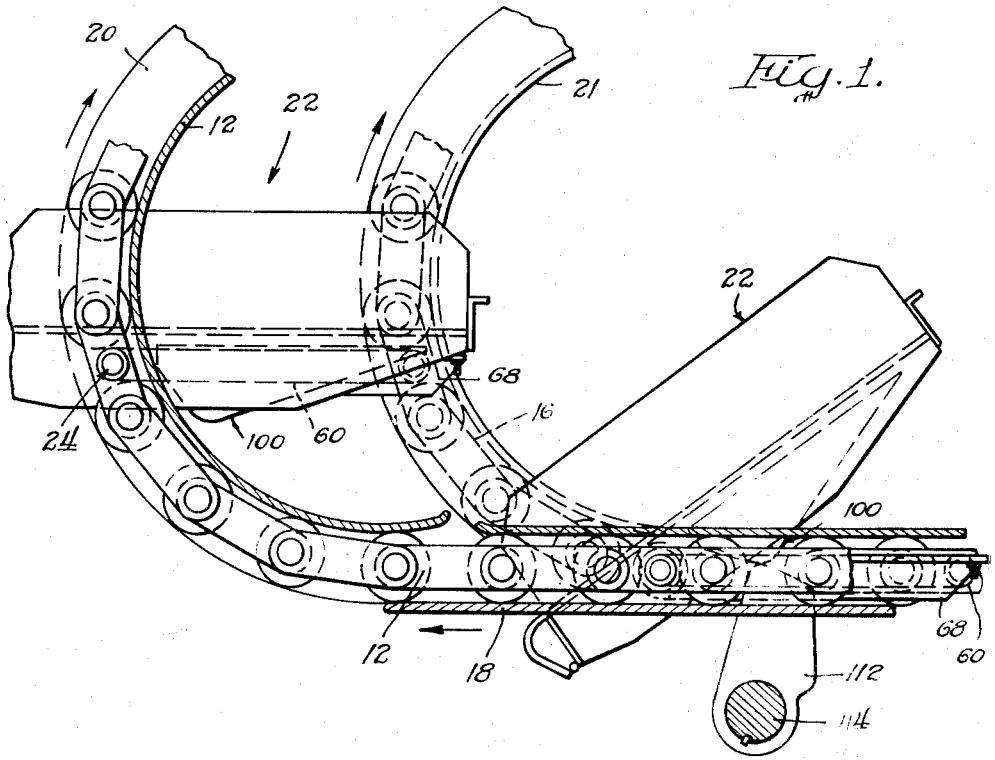
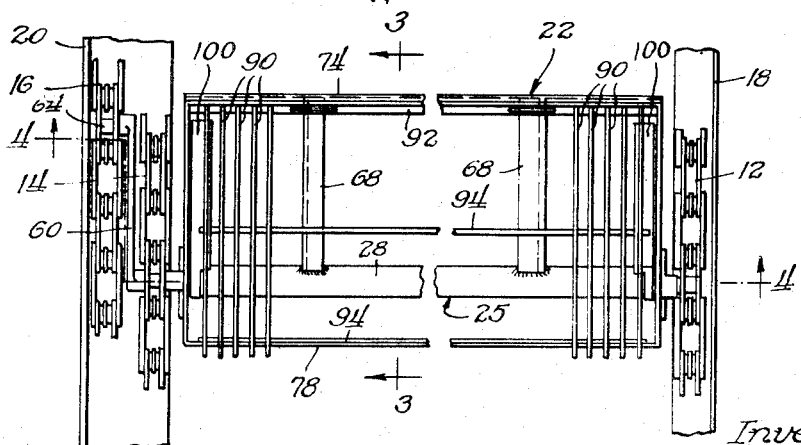
Inventors:
Joseph L. Mahoney,
Carl J. Rundquist,
Carl R. Skarin.
By
Barth Freeman
Attorneys

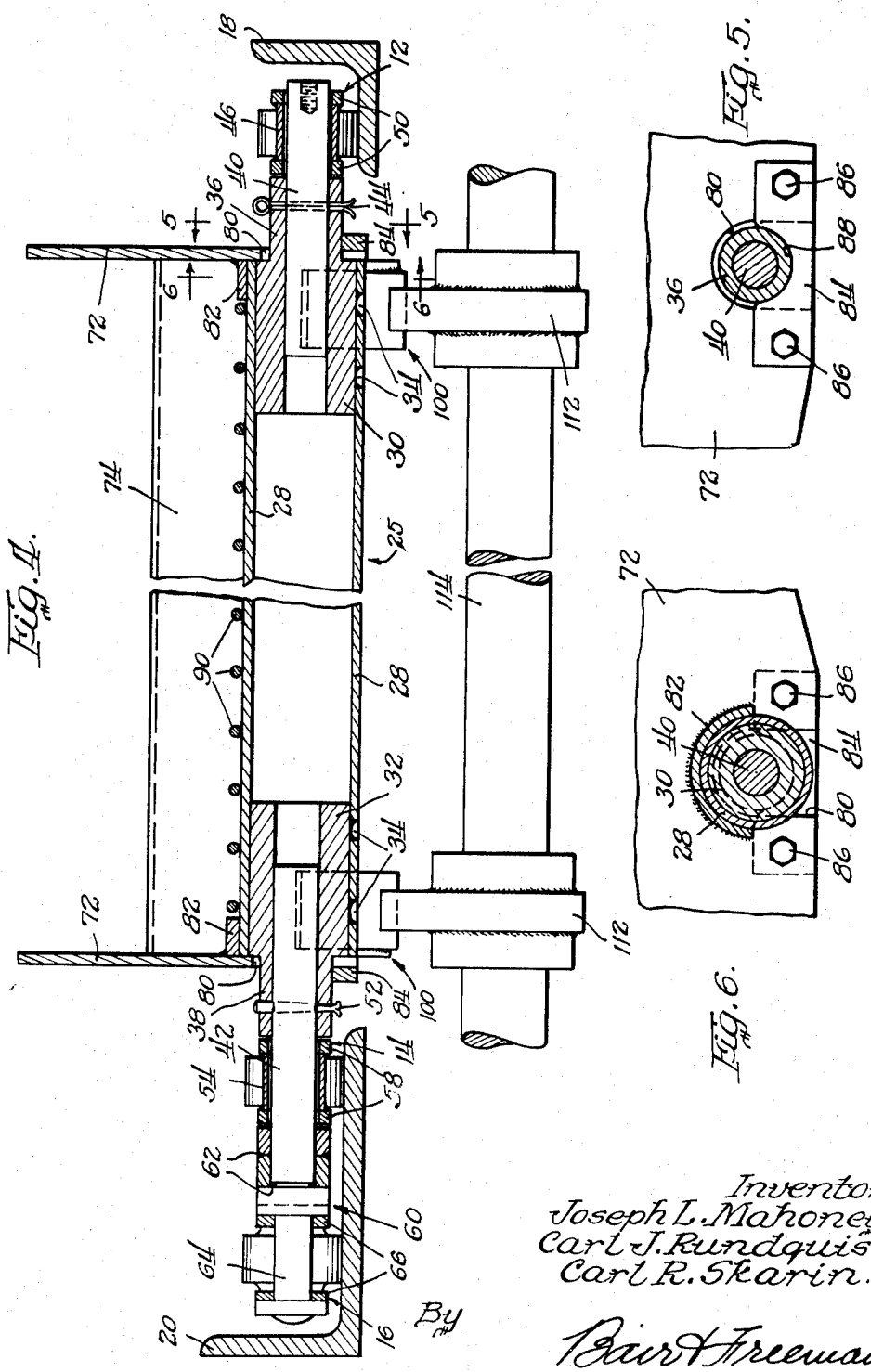

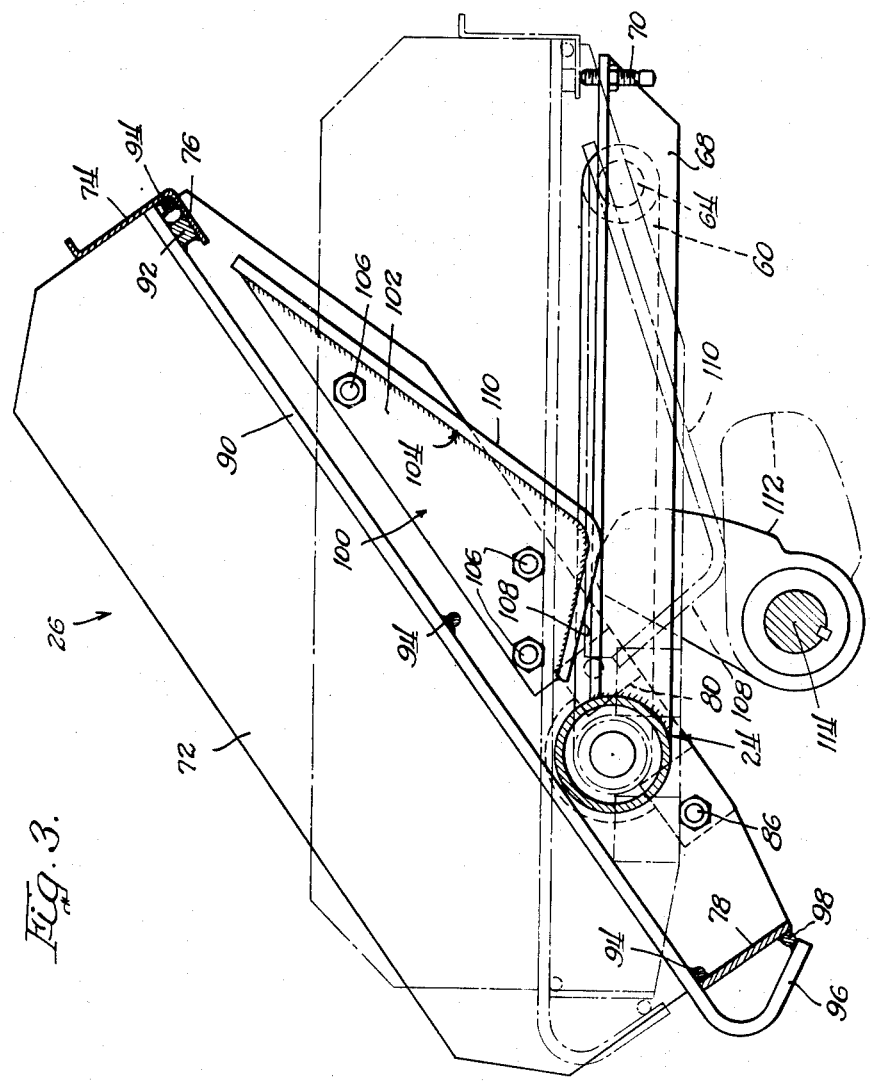

Patented Aug. 26, 1952

2,608,287

UNITED STATES PATENT OFFICE 2,608,287

TRAY FOR CONVEYER OVEN

Joseph L. Mahoney, Joliet, Carl J. Rundquist, Chicago, and Carl R. Skarin, Western Springs, Ill., assignors to The Petersen Oven Company, Chicago, Ill., a corporation of Illinois Application August 12, 1946, Serial No. 689,970

11 Claims. (Cl. 198—138)

This invention relates to trays for conveyors used in food baking ovens.

Trays of this general type are designed to be retained level on different runs through the oven, i. e., on horizontal and vertical runs, and around bends. The outstanding advantage of this feature is that trays loaded with food to be baked can be run through the oven to its farthest end and returned, to realize the longest baking time for a given length of oven.

The tray of the present invention is especially adapted for use with a conveyor of the general type disclosed in Cook Patent No. 2,242,813, issued May 20, 1941. The trays are spaced along the conveyor, and at a certain point each of the trays is adapted to be tilted for dumping its load of baked food.

The present invention is directed to a particular construction of tray and a tiltable grille therefor.

One of the objects of the invention is the provision of a large tray in which distortion is eliminated and which can be maintained true in its travel through the oven, despite its large expanse.

Another object is the provision of a tiltable tray composed of a frame or supporting structure, and a grille which is tiltable about the supporting structure, the latter remaining in horizontal position.

A further object is the provision of such a tray as just described, in which the grille can be removed from the supporting structure, without interfering with the mounting of the supporting structure on the conveyor, and without disassembly of the conveyor chains.

A further object of the invention is the provision of a tray having a relatively rigid grille, and a supporting structure for maintaining the grille in true position.

Still another object is the provision of such a tray in which the tiltable grille is partially balanced for easy tilting.

The tray, as described above, includes a stabilizing arm maintained horizontal by the conveyor chains, and includes a shaft extending transversely across the oven. This shaft is secured against rotation by the stabilizing arm, and an intermediate portion of the grille is pivoted on the shaft. Since the grille only is tilted, there is no rotation of the shaft in the conveyor, and friction is kept at a minimum, resulting in easy and efficient tilting of the grille.

The rear end of the grille is supported by cantilever arms carried by the shaft, and can be adjusted thereon by the adjustment of simple adjusting means. This adjustment of the grille tends to prevent and compensate for distortion thereof which a load tends to produce, such as occurs in previous constructions.

A further object of the invention is that the tray can be used in any oven, whether the tray is to be tilted or maintained fixed throughout its run in the oven.

A still further object of the invention is that by retaining the grille in a horizontal position and preventing its distortion, the food is baked uniformly because all of the pieces are maintained substantially level; thus the food does not run from one side of the baking pans to the other.

With these and other objects in view, our invention consists in the construction, arrangement and combination of the various parts of our device, whereby the objects contemplated are attained, as hereinafter more fully set forth, pointed out in the claims and illustrated in the accompanying drawings, wherein:

Fig. 1 is a side view of a portion of the oven conveyor, showing two trays mounted therein, with one of the trays in tilted position;

Fig. 2 is a plan view of a tray and portions of the conveyor chains;

Fig. 3 is an enlarged view taken on line 3—3 of Fig. 2;

Fig. 4 is an enlarged view taken on line 4—4 of Fig. 2;

Fig. 5 is a view taken on line 5—5 of Fig. 4; and

Fig. 6 is a view taken on line 6—6 of Fig. 4.

Referring in detail to the drawings, the oven conveyor consists of two main chains 12 and 14, and an auxiliary chain 16. The type of oven in which the tray of the present invention may be employed, and the path of the conveyor through the oven may be seen in the patent of Carl J. Rundquist, No. 2,541,386, February 13, 1951. That patent discloses a means for dumping the trays and is applied to the general type of tray shown here. The present invention is directed to the construction of the tray itself.

The direction of travel of the conveyor and trays when the tilting or dumping occurs is indicated by arrows in Fig. 1. At times the tray travels in the opposite direction, but for purposes of the present illustration the leading and trailing edges of the tray will be based on the direction of travel indicated here. The chain 12 is supported by an angle-iron track 18, and the main chain 14 and auxiliary chain 16 are supported by angle-iron tracks 20 and 21 on the opposite side of the oven.

The tray is indicated as a whole at 22, and comprises a supporting structure 24 and a grille 26. The supporting structure 24 includes a shaft, indicated generally at 25, comprising, a tubular member or pipe 28, and a pair of hollow studs 30 and 32, one secured in each end of the pipe 28. The hollow studs 30 and 32 extend a short distance into the ends of the pipe 28 and have a press fit therewith. On one side of the pipe 28 are a number of holes 34, exposing the hollow studs and in which weld material is placed for securing the hollow studs 30 and 32 in tight engagement in the pipe 28. The hollow studs 30 and 32 have reduced portions 36 and 38, respectively, extending outwardly beyond the ends of the pipe 28. Fitted in the hollow studs 30 and 32 are short rods or pins 40 and 42, respectively. The pins 40 and 42 extend outwardly beyond the outer end of the reduced portions 36 and 38 to different extents for the purpose which will appear as the description proceeds.

The pin 40 is secured in the hollow stud 30 by means of a cotter key 44, and on the extended end of the pin 40 is a spacer 46 fitted between the members 50 through which the pin 40 extends. The two members 50 form one link of the main chain 12.

The pin 42 is firmly secured against rotation in the hollow stud 32 by a tapered pin 52 extending through the two pieces and having a split end for securing it therein. The outer end of the pin 42 extends through side members 58 forming one link of the main chain 14, a spacer 54 being fitted on the pin between the members 58.

A stabilizing arm 60 is welded on the outer end of the pin 42, as indicated at 62, and extends rearwardly therefrom between the main chain 14 and the auxiliary chain 16. At the rear end of the stabilizing arm is a stud 64 extending laterally therefrom and extending through the side pieces 66 forming one link of the auxiliary chain 16.

A pair of cantilever supporting arms 68 in the form of angle irons, are secured to the pipe 28 as by welding, and extend rearwardly therefrom, the leg portions of the angle irons extending vertically, and horizontally. At the rear end of each cantilever arm 68 is a set screw 70 threaded in the horizontal leg of the angle forming the cantilever arms, and provided with a lock nut.

The grille 26 includes a pair of vertically disposed side plates 72 having a transverse member 74 welded across the rear ends of the side plates. The transverse member has a horizontal portion 76 at its lower edge extending forwardly. The transverse member 74 is positioned so that the horizontal portion 76 is spaced upwardly from the bottom edges of the side plates, and the vertical portion terminates below the upper edges of the side plates. A second transverse member 78 is disposed vertically across the lower front edges of the side plates 72, and welded thereto. The upper edge of the transverse member 78 is substantially level with the horizontal portion 76 of the transverse member 74. The transverse member 74 acts as a back plate to prevent the pans of food from sliding off in that direction.

Toward the front or leading edge of the tray, a cut-out portion 80 is formed in each side plate, at the lower portion thereof, and opening downwardly. Welded to the inner surface of each side plate 72 is a semi-circular bearing member 82 having its open side disposed downwardly. The grille is placed on the shaft 25 by placing the cut-out portions 80 over the reduced ends 36 and 38, so that the semi-circular bearing surfaces 82 rest on the ends of the pipe 28. For securing the grille on the shaft 25 a plate or closure member 84 is secured across the open side of each opening 80, under the reduced portions 36 and 38, and bolted to the respective side plates 72 as indicated at 86. The plates 84 have rounded cavities 88 for fitting against the undersurface of the reduced portions 36 and 38.

The surface of the grille for supporting food articles is formed by a plurality of substantially parallel rods 90 spaced laterally across the tray and extending from front to rear. Disposed transversely of the tray are a plurality of rods 94 welded to the undersurfaces of the rods 90. The rods 94 are three in number, and the rear one is disposed under the rear ends of the rods 90, and on the horizontal extension 76 of the rear transverse member 74. The front rod 94 is positioned adjacent the front transverse member 78 and welded thereto and to the rods 90. The front ends of the rods 90 are turned down over the upper edge of the transverse member 78 to form loops 96, which terminate at the lower edge of the transverse member 78, where an additional transverse rod 98 is positioned and welded to both the lower edge of the transverse member 78 and the extremities of the loops 96.

The rods 90 are thus positioned at such a height in the grille that they are disposed immediately above the tubular pipe 28, when the grille is in place on the shaft 25. When a load is placed on the rods, the pipe 28 provides a bearing surface for the rods.

Spacers or fillers 92 are secured on the horizontal portion 76 of the transverse member 74 and positioned over the adjusting screws 70 for providing solidity of the grille structure at these points.

Secured to the inner side of each of the side plates 72 and disposed rearwardly of the shaft 25 is a cam shoe 100. The cam shoes are each formed of a plate 102 and a cam surface 104 at right angles to the plate 102. The cam shoe is secured to the side plate 72, by means of a plurality of bolts 106.

The cam surface 104 has a front or leading cam surface 108 disposed at a steep angle to the direction of travel of the tray and a rear or trailing surface 110 at a lower slope extending in an opposite or rearward direction.

For tilting the grille a pair of rotating cams 112 are secured to a shaft 114 positioned below the line of travel of the tray, for simultaneous engagement by a pair of cam shoes 100, at opposite ends of each tray.

The cams 112 are rotated clock-wise as viewed in Fig. 3, and are so synchronized with the movement of the trays as to engage the leading cam surfaces 108 of the cam shoes to raise each tray to the full line position shown in Fig. 3. On further rotation, the cams 112 recede from the cam shoes and permit the tray grille to lower to its horizontal position. The details of the mechanism for operating the cams 112 may be found in the Rundquist application mentioned above.

It will be seen that the stabilizing arm 60 is always retained in horizontal position by the constant relation between the auxiliary chain 16 and the main chain 14 of the conveyor, and as a direct consequence thereof, the cantilever supporting arms 68 are retained horizontal, which in turn support the tray grille in horizontal position at all times except when tilted. The distance between the curved portions of the tracks 20 as shown in Fig. 1, is the same as the length of the stabilizing arm, so that the supporting structure of the tray is retained in horizontal position. The details of this conveyor can be found in the Cook patent referred to above. The stabilizing arm 60 is welded to the pin 42, and the hollow stud 32 is secured to the pin 42 by means of the tapered pin 52, and the pipe 28, being welded to the hollow stud 32, is retained against rotation. The cantilever arms 68 are thereby retained in horizontal position.

The grille 26 possesses a considerable degree of adjustment due to the peculiar type of supporting surface formed by the rods 90. The adjustment screws 70 can be raised or lowered to adjust the height of the rear ends of the grille for maintaining it in horizontal position; and one or the other of the adjustment screws 70 alone may be adjusted for adjusting one corner or the other of the tray for eliminating or compensating for distortion of the tray. The greater weight of the tray resides rearwardly of the pivotal support thereof on the shaft 25, and after tilting resumes its horizontal position by gravity.

The grille can be removed from the tray easily and conveniently by removing the closure members 84 from the side plates 72 and lifting the tray off of the shaft 25. This eliminates the necessity of removing the shaft or supporting structure from the conveyor, and also avoids disassembly of the chains, which at best is a difficult and time consuming job.

The grille is light in weight due to its peculiar construction and as a consequence, it can be tilted easily, and its light weight as well aids in its removal in an easy manner.

While we have shown a particular embodiment of our invention, it will be understood of course that we do not wish to be limited thereto since many modifications may be made, and we therefore contemplate by the claims appended hereto to cover any such modifications or substitutions of equivalents as fall within the true spirit and scope of the invention.

We claim:

1. In a tray, for a baking oven having a conveyor with runs on opposite sides of the oven, and having a stabilizing arm adapted to be retained in horizontal position by the conveyor, the combination comprising, a transverse shaft secured against rotation to said stabilizing arm and having its ends mounted in and carried by said runs of the conveyor, a plurality of supporting arms rigidly secured to said shaft intermediate the ends of the shaft and extending substantially horizontally therefrom, and a grille pivoted on said shaft and having the major portion extending therefrom in the same direction as said arms with the supporting surface of the grille being disposed above the axis of the shaft, said supporting arms serving to support the free end of said grille.

2. In a tray, for a baking oven having a conveyor with runs on opposite sides of the oven, and having a stabilizing arm adapted to be retained in horizontal position by the conveyor, the combination comprising, a transverse shaft secured against rotation to said stabilizing arm and having its ends mounted in and carried by said runs of the conveyors, a plurality of supporting arms rigidly secured to said shaft intermediate the ends of the shaft and extending substantially horizontally and rearwardly therefrom, and a grille pivoted on said shaft intermediate the ends thereof with the supporting surface of the grille being disposed above the axis of the shaft, the preponderance of weight of the grille being in the direction of said arms from said shaft, said supporting arms serving to support the end of said grille having said preponderance of weight.

3. In a tray for a baking oven having a conveyor, said tray having a stabilizing arm mounted in and adapted to be retained in horizontal position by the conveyor, the combination comprising, a tubular pipe, a hollow stud in each end of said tubular pipe, said hollow studs being secured against rotation in said tubular pipe, a pin in each hollow stud and extending outwardly beyond the ends thereof, a shear pin securing one of said pins against rotation in its respective hollow stud, said one pin being secured against rotation to said stabilizing arm, the other of said pins being mounted in the conveyor, a tiltable grille mounted on said pipe, and means fixedly secured to said pipe for retaining said grille in horizontal position.

4. In a tray for a baking oven having a conveyor, said tray having a stabilizing arm mounted in and adapted to be retained in horizontal position by the conveyor, the combination comprising, a tubular pipe, a hollow stud in each end of said tubular pipe, said hollow studs each having a large portion and a reduced portion and having its large portion secured against rotation to said tubular pipe and having its reduced portion extending outwardly beyond its end of said tubular pipe, a pin in each hollow stud and extending outwardly beyond the ends of the reduced portions thereof, a shear pin securing one of said pins against rotation in its respective hollow stud, said one pin being secured against rotation to said stabilizing arm, the other of said pins being secured in the conveyor, a tiltable grille mounted on said pipe, and means fixedly secured to said pipe for retaining said grille in horizontal position.

5. In a tray for a baking oven having a conveyor, said tray having a stabilizing arm mounted in and adapted to be retained in horizontal position by the conveyor, the combination comprising, a shaft, said shaft having reduced ends, one of the reduced ends being mounted in and secured against rotation to said stabilizing arm, the other reduced end being mounted in the conveyor, a grill including a pair of side plates having openings in the lower edges thereof, said openings being adapted to fit over said reduced ends of the shaft, removable closure members secured to said side plates over each of said openings under said reduced ends of said shaft, and means on said shaft for supporting said grille in horizontal position.

6. In a tray for a baking oven having a conveyor, said tray having a stabilizing arm mounted in and adapted to be retained in horizontal position by the conveyor, the combination comprising, a shaft, said shaft having reduced ends, one of the reduced ends being mounted in and secured against rotation to said stabilizing arm, and the other reduced end being mounted in the conveyor, a grille including a pair of side plates having openings in the lower edges thereof, said openings being adapted to fit over said reduced ends of the shaft, removable closure members secured to said side plates over each of said openings under said reduced ends of said shaft, bearing means on said side plates adapted to engage said shaft inwardly of the reduced ends for pivotally supporting the grille on the shaft, and additional means on said shaft and cooperating with said bearing means for supporting said grille in horizontal position.

7. A tiltable grille for a tray to be mounted on a conveyor traveling through a baking oven, said grille having a leading edge and a trailing edge, said grille comprising, a pair of vertically extending side plates, transverse members secured to said side plates at the leading edge and at the trailing edge thereof, and a plurality of parallel rods secured to said transverse members and extending substantially the length of said side plates, the forward ends of said parallel rods being turned down over and secured to said transverse member at the leading edge of the grille, forming open loops extending forwardly of said leading edge.

8. A tiltable grille for a tray having a shaft, said tray being adapted for mounting on a conveyor in a baking oven, said grille comprising a pair of side plates, a plurality of transverse members secured to said side plates, a supporting surface secured to said transverse members, means on said side plates adjacent the bottom thereof and below said supporting surface for pivotally mounting the grille on said shaft, and cam means secured to the inner surface of each of said side plates and at the lower portions thereof, said cam means being adapted for engagement by operating means for tilting said grille.

9. A tiltable grille for a tray to be used on a conveyor, traveling through a baking oven, said grille having a leading edge and a trailing edge, said tray having a shaft for pivotally mounting said grille, said grille comprising, a pair of side plates, an L-shaped transverse member secured to said side plates at the trailing edge of the grille and having a flat portion spaced upwardly from the bottom edges of said side plates, and a vertical portion forming a wall at the trailing edge of the grille, a vertically disposed transverse member secured between said side plates at the leading edge of the grille, a plurality of laterally spaced parallel rods secured to said transverse members, said rods being parallel with said side plates and of substantially the length of said side plates, the forward ends of said rods being bent downwardly over the upper edge of said vertically disposed transverse member and terminating at the lower edge of said transverse member to form open loops extending forwardly of said transverse member at the leading edge, said side plates having openings formed in their lower edges for pivotally supporting the grille on said shaft, on an axis below said rods, closure members for said openings positioned under said shaft, cam means secured to each of said side plates rearwardly of the pivot point of the grille, said cam means being adapted for engagement by operating means for tilting the grille.

10. In a tray for a baking oven, said tray being adapted to be mounted in a conveyor having a main chain on one side of the oven and a main chain and an auxiliary chain on the other side, the combination comprising, a transverse shaft adapted to be mounted in the main chains, a stabilizing arm adapted to be positioned between the auxiliary chain and the adjacent main chain, said stabilizing arm being fixedly secured to said shaft and having its other end adapted to be secured in the auxiliary chain, the chains of the conveyor serving to retain said stabilizing arm in horizontal position in all positions of the chains, a plurality of cantilever arms spaced along said shaft and rigidly secured thereto and extending horizontally therefrom, and a grille pivotally mounted on said shaft with the supporting surface of the grille being disposed above the axis of the shaft, said cantilever supporting arms together with said pivotal mounting serving to support said grille in horizontal position.

11. In a tray, adapted to be mounted on a conveyor of a baking oven, and having a stabilizing arm adapted to be retained in horizontal position by the conveyor, the combination comprising, a transverse shaft secured against rotation to said stabilizing arm, a plurality of supporting arms rigidly secured to said shaft and extending substantially horizontally therefrom, a grille pivoted on said shaft and extending therefrom in the same direction as said arms with the supporting surface of the grille being disposed above the axis of the shaft, said supporting arms serving to support the free end of said grille, and cam means secured to said grille on the same side of said shaft as said supporting arms, said cam means being adapted for engagement by operating means for pivoting said grille.

JOSEPH L. MAHONEY.
CARL J. RUNDQUIST.
CARL R. SKARIN.

REFERENCES CITED

The following references are of record in the file of this patent:

UNITED STATES PATENTS

| Number | Name | Date |
| --- | --- | --- |
| 855,141 | Sommers | May 28, 1907 |
| 1,312,294 | Allison | Aug. 5, 1919 |
| 1,343,184 | Baker et al. | June 8, 1920 |
| 1,412,444 | Baker | Apr. 11, 1922 |
| 1,488,251 | House | Mar. 25, 1924 |
| 1,680,441 | Adams | Aug. 14, 1928 |
| 1,949,964 | Keller | Mar. 6, 1934 |
| 2,007,044 | Francis | July 2, 1935 |
| 2,342,393 | Feige | Feb. 22, 1944 |
| 2,397,726 | Cook | Apr. 2, 1946 |